C. J. YOUNG.
DUMPING TRUCK.
APPLICATION FILED JULY 7, 1914.

1,157,749.

Patented Oct. 26, 1915.
3 SHEETS—SHEET 1.

Witnesses
James E. Sproll
Clara A. Harn

Inventor
Carl J. Young.
By Adams & Brooks
Attorneys

C. J. YOUNG.
DUMPING TRUCK.
APPLICATION FILED JULY 7, 1914.
1,157,749.
Patented Oct. 26, 1915.
3 SHEETS—SHEET 2.
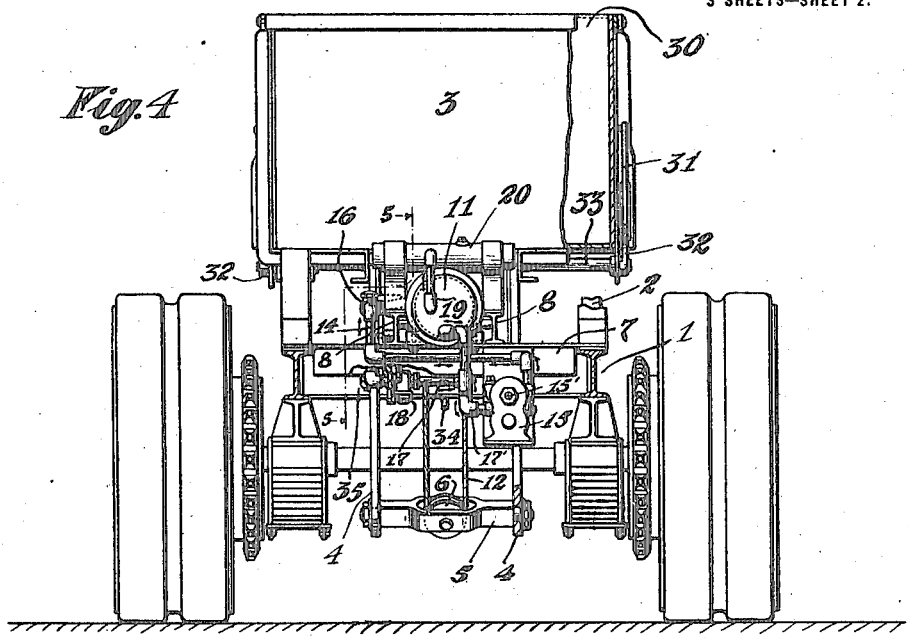
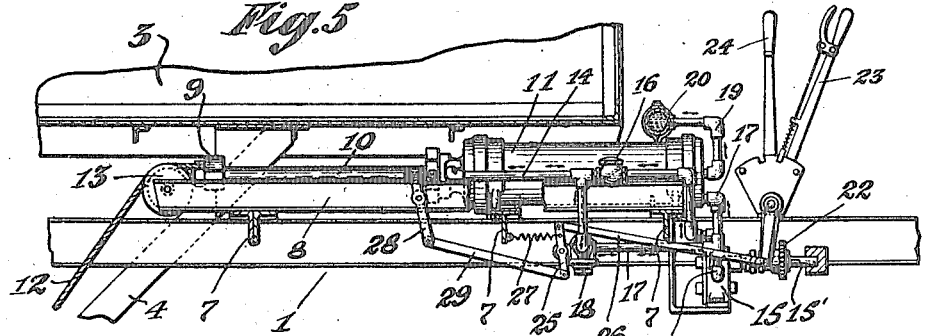
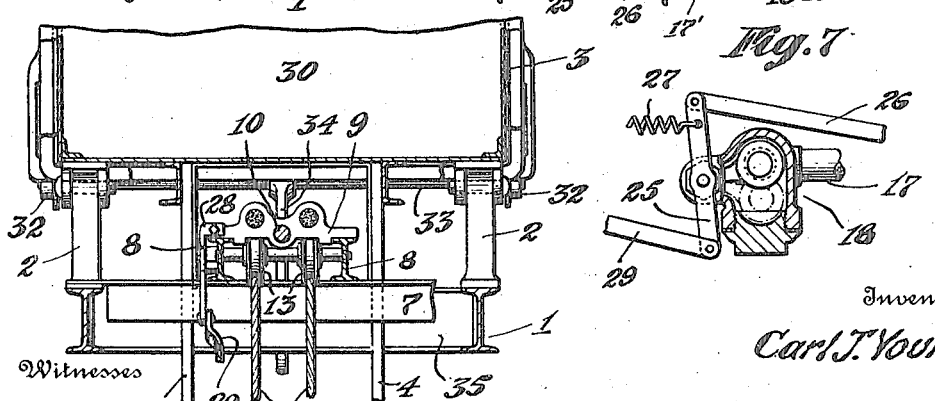
Inventor
Carl J. Young.
Witnesses
James E. Sproll
Clara A. Herm
By
Adams & Brooks
Attorneys C. J. YOUNG.
DUMPING TRUCK.
APPLICATION FILED JULY 7, 1914.
1,157,749.
Patented Oct. 26, 1915.
3 SHEETS—SHEET 3.
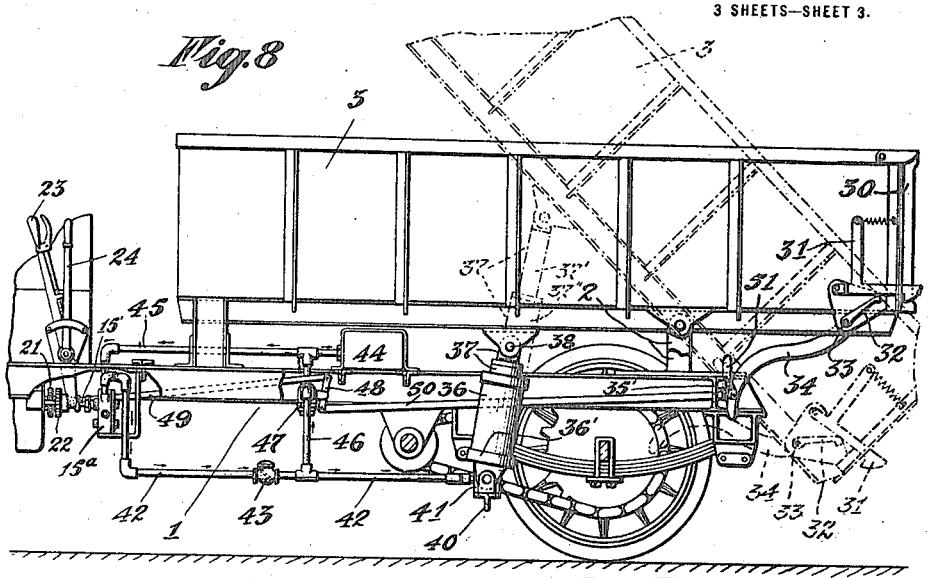
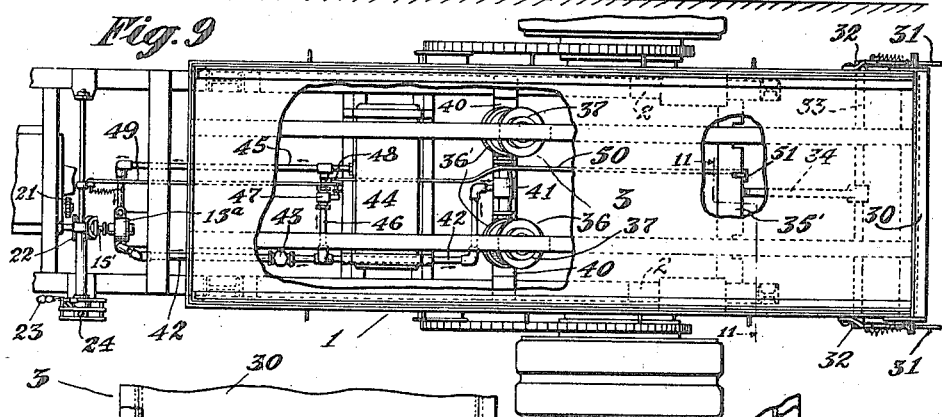
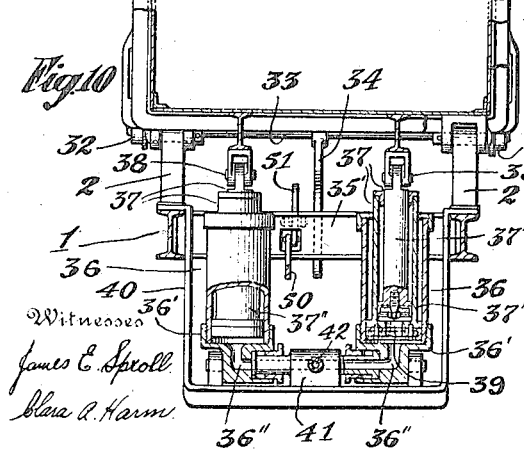
Witnesses
James E. Sproll
Clara A. Harm
Inventor
Carl J. Young.
By Adams & Brooks
Attorneys

UNITED STATES PATENT OFFICE.

CARL J. YOUNG, OF SEATTLE, WASHINGTON.

DUMPING-TRUCK.

1,157,749. Specification of Letters Patent. Patented Oct. 26, 1915.

Application filed July 7, 1914. Serial No. 849,415.

*To all whom it may concern:*

Be it known that I, CARL J. YOUNG, a citizen of the United States of America, and a resident of the city of Seattle, in the county of King and State of Washington, have invented certain new and useful Improvements in Dumping-Trucks, of which the following is a specification.

The present invention pertains to vehicles of the above character and it has for its primary aim to provide such a construction which will be efficient in operation and simple of management.

Further objects reside in the mechanism for tilting the dump body, the automatic control of the mechanism, and simplified structural features throughout insuring durability and practicality.

These and other aims I accomplish by the construction illustrated in the accompanying drawings and specified in the following description, and those features of construction, arrangements and combinations of parts on which I desire protection will be succinctly defined in the appended claims.

Figure 1:
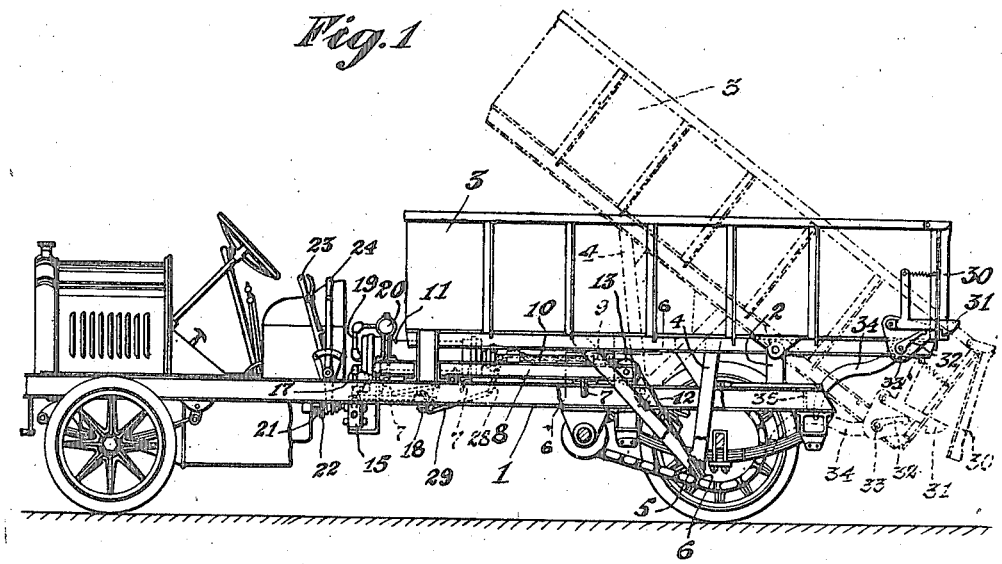
Figure 2:
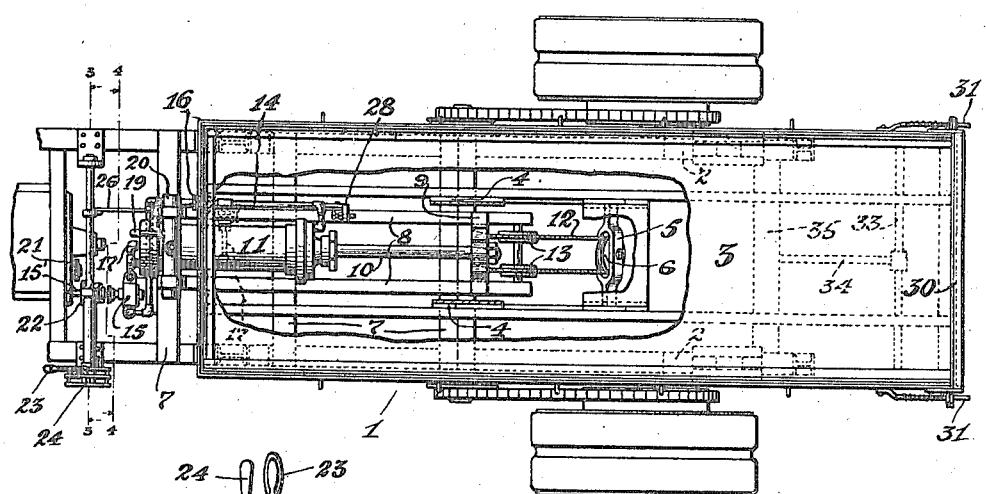
Figure 3:
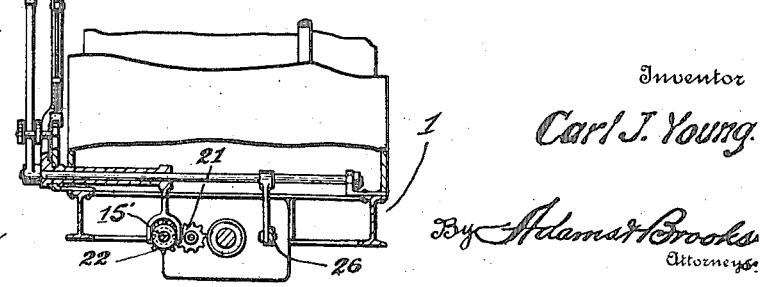

In the drawings: Figure 1 is a side elevation of a dump truck embodying my invention, parts being omitted for clearness of understanding and the dump body being shown in a tilted position by dotted lines. Fig. 2 is a fragmentary plan view with portions broken away. Fig. 3 is a fragmentary section taken on line 3—3 of Fig. 2. Fig. 4 is a transverse sectional view on line 4—4 of Fig. 2 with portions omitted to disclose more clearly the invention. Fig. 5 is a longitudinal section through the body tilting mechanism taken about on line 5—5 of Fig. 4. Fig. 6 is an enlarged section on line 6—6 of Fig. 1. Fig. 7 is a detailed section of the controlling valve. Fig. 8 is a fragmentary side elevation of a truck embodying a modification of the body tilting mechanism. Fig. 9 is a top plan thereof with a portion of the body broken away. Fig. 10 is a transverse section of the modified body tilting mechanism with parts shown in elevation, and Fig. 11 is a detail section on line 11—11 of Fig. 9 of the valve trip which permits of the body, in tilting automatically opening the pressure relieving valve.

Referring by like characters of reference to corresponding parts throughout, 1 denotes the chassis supporting the standards 2 to which the dump body 3 is pivotally mounted for dumping its contents. Depending from the body 3 are a pair of brackets 4 which support an interposed swivel block 5 carrying a pulley 6.

On suitable transverse frame members 7 of the chassis I mount a longitudinally arranged pair of parallel guides 8 on which slides a crosshead 9 connected by rod 10 to the piston of cylinder 11 disposed at the forward end of the guides. A cable or flexible member 12, taking about pulley 6, has both of its ends fixed to crosshead 9 and is guided over the sheaves 13, which are interposed between the guides 8, for directing the pulling force parallel with the movement of the piston. Movement of the piston forwardly will therefore swing the body vertically on its pivotal mounting.

I utilize fluid, preferably oil, under pressure for operating the piston, the same being admitted to the cylinder 11, at the rear of the piston, through pipe 14 which is connected to the outlet of pump 15 and provided with a check valve 16 to maintain the fluid under pressure subsequent to ceasing the operation of the pump. A return pipe 17, connected to pipe 14 between the cylinder and the check valve and leading to the cylinder on the opposite side of the piston, is provided with a valve 18 which, when opened, relieves the fluid in the cylinder and permits of it entering the forward end of the cylinder. A branch connection 17' joins pipe 17 to the inlet of the pump for supplying the latter for the succeeding operation, while pipe 19 connects the forward end of the cylinder to a superpositioned reservoir 20 which replenishes the supply of fluid needed for the efficient operation of the mechanism should any escape.

The pump is driven from the truck motor through gears 21 and 22, the former of which is the drive while the latter is the driven gear and is slidable on the pump shaft 15' whereby it may be thrown out of and in mesh with the drive gear 21 by lever 23.

A lever 24 is connected to valve lever 25 by link 26 for opening the valve 18 while spring 27 normally retains the latter closed. A trip 28, arranged in the path of crosshead 9 for operation thereby as it approaches its forward terminal position, is connected by link 29 to valve lever 25 for automatically stopping the piston should the gear 22 not be thrown out of mesh at the proper moment.

In operation, fluid is pumped into the cylinder 11 for elevating the forward end portion of the dump body 3 until valve 18 is opened either by crosshead 9 tripping lever 28 or manual operation of lever 24, or until gear 22 is thrown out of mesh with gear 21. The body may be supported at a predetermined inclination upon stopping the motor prior to the valve 18 being opened. Upon opening the valve 18 the body will lower by gravity. When the trip 28 is operated by crosshead 9 to open the valve, the body 3 will then gravitate to effect a releasing of the trip which closes the valve and starts the operation of the piston again whereby a series of oscillations may automatically be given the body.

The door or rear wall 30 of body 3 is pivotally mounted for gravitating to an opened position when released by latches 31 which latter are lifted by arms 32 of rock shaft 33 on trip arm 34 of the latter engaging a fixed cross member 35 of the chassis when the body is tilted.

In the modified construction, I employ a different body tilting mechanism comprising cylinders 36 and the telescopic pistons 37. The pistons comprise solid sections 37' pivoted to the underside of body 3, as at 38, and hollow sections 37" slidably receiving the solid sections and each having a head portion provided with an opening 39. These hollow sections are slidable in the cylinders 36 which latter have their heads 36' formed with inlet ports 36" for admitting a fluid into the cylinders for extending the pistons and thereby tilt the body 3. The cylinder heads 36' are swingingly supported on a suspended bracket 40 and have swivel connection with an interposed manifold member 41 communicating with the inlet ports of the heads 36'.

Fluid is conveyed to manifold 41 through pipe 42 from pump 15ª, said pipe being provided with a check valve 43. A fluid reservoir 44 is connected to the inlet of the pump by pipe 45 and the latter is connected to pipe 42, between valve 43 and the cylinders 36, by pipe 46 through which the fluid under pressure in the cylinders may flow upon opening the valve 47 disposed therein. The lever 48 of valve 47 is connected by link 49 to a manipulative lever 24 while link 50 connects lever 48 to a trip 51 mounted on cross member 35' of the chassis for operation by the body 3 when tilting.

The foregoing detailed description has been given for clearness of understanding only, and no undue limitation is to be understood therefrom, but the appended claims are to be construed as broadly as is permissible in view of the prior art.

Having thus described my invention, what I claim as new, and desire to secure by Letters Patent of the United States of America, is:—

1. In a device of the character described, a dumping body, a means for raising the body to dumping position by power, a trip actuated when the body has reached its dumping position to release the body raising means to thereby permit the body to drop, independent means acting to restore the action of said body raising means upon the backward return of the body, and manually operable means for holding said restoring means out of action.

2. In a device of the character described, a tilting body, a fluid pressure operated mechanism for raising said body to a dumping position, means for automatically producing a continuing alternating action of said raising mechanism when the body reaches a desired elevation.

3. In a device of the character described, a tilting body, a fluid-operated mechanism for raising said body to a tilting position and for lowering the body to its normal position, and means for automatically operating said mechanism to produce a continuing vibratory movement in the tilting body.

4. In a device of the character described, a tiltable body, a fluid pump, a power cylinder and piston operated by said pump and connected to tilt said body, a by pass forming a connection between opposite ends of the cylinder, and between opposite sides of the pump containing a manually operable valve, and means automatically operable by the body-raising or tilting mechanism for successively reversing said valve to thereby produce a vibratory movement in the body.

5. In a truck tilting mechanism, in combination, a power raising mechanism containing a cut-out, and means for automatically operating the same by the raising of the body at a predetermined point, and a spring acting to reverse the cut out and reapply the power.

6. In a truck tilting mechanism, in combination, a cylinder and piston connected to tilt the truck body, a fluid pump, a power drive connection for said pump, a supply connection from the pump to the cylinder, a by-pass for the pump, a value controlling said by-pass, a spring normally holding the by-pass valve closed and a member moved in conformity with the tilting of the truck body to engage and open the by-pass.

7. In a truck tilting mechanism, in combination, a cylinder and piston connected to tilt the truck body, a fluid pump, a power drive connection for said pump, supply and discharge connections from the pump to opposite ends of the cylinder, a by-pass containing a valve and connecting said supply and discharge, a spring normally acting to close said valve, a hand lever connected to control said valve and a member connected to move in conformity with the piston and adapted to open said valve at a predetermined point in the movement of the piston.

8. In a truck, in combination, a chassis, a body pivoted on the chassis to be tilted into dumping position, a pump, a fluid operated cylinder mounted on the chassis, a piston in said cylinder, a piston rod having a connection with the truck body to tilt it, a valve controlling the fluid operating said piston, a lever, means connecting said lever with the valve to control the latter, means for operating said lever from the piston rod at a predetermined point to reverse the flow of fluid for the cylinder, and a spring acting upon the valve to normally hold it in position for delivering fluid to the lifting end of the cylinder.

9. In a device of the character described, a dumping body, a power means for raising and lowering the same, and means for automatically releasing said power means upon the body reaching a predetermined elevation, and means for automatically applying the power raising means upon the fall of the body a short distance below said releasing position.

Signed at Seattle, Washington, this 19 day of June, 1914.

CARL J. YOUNG.

Witnesses:
E. ARLITA ADAMS,
GEORGE BEATTIE.